United States Patent
Lin

(10) Patent No.: US 11,297,654 B2
(45) Date of Patent: Apr. 5, 2022

(54) METHODS AND APPARATUS TO TRANSMIT WITH RESOURCES OVERLAPPED

(71) Applicant: MEDIATEK INC., Hsinchu (TW)

(72) Inventor: Guan-Yu Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 1 day.

(21) Appl. No.: 16/831,225

(22) Filed: Mar. 26, 2020

(65) Prior Publication Data

US 2020/0314915 A1 Oct. 1, 2020

Related U.S. Application Data

(60) Provisional application No. 62/825,090, filed on Mar. 28, 2019.

(51) Int. Cl.
*H04W 74/08* (2009.01)
*H04W 72/10* (2009.01)

(52) U.S. Cl.
CPC ....... *H04W 74/0833* (2013.01); *H04W 72/10* (2013.01)

(58) Field of Classification Search
CPC ............. H04W 74/0833; H04W 72/10; H04W 74/004; H04W 72/14; H04W 72/1289
See application file for complete search history.

(56) References Cited

U.S. PATENT DOCUMENTS

| | | | |
|---|---|---|---|
| 10,616,909 B2* | 4/2020 | Jung | H04W 72/1242 |
| 2017/0019930 A1* | 1/2017 | Lee | H04W 72/0413 |
| 2017/0041917 A1* | 2/2017 | Agiwal | H04W 8/005 |
| 2018/0139787 A1 | 5/2018 | Islam et al. | |
| 2018/0206260 A1 | 7/2018 | Khoryaev et al. | |
| 2019/0253977 A1* | 8/2019 | Wang | H04W 72/0473 |
| 2019/0349836 A1 | 11/2019 | Lee et al. | |

(Continued)

FOREIGN PATENT DOCUMENTS

| | | |
|---|---|---|
| CN | 107926004 A | 4/2018 |
| WO | WO 2017/026973 A1 | 2/2017 |
| WO | WO 2018/074874 A1 | 4/2018 |

OTHER PUBLICATIONS

Office Action dated May 27, 2021 in corresponding Taiwanese Patent Application No. 109110481, 5 pages.

(Continued)

*Primary Examiner* — Dinh Nguyen
(74) *Attorney, Agent, or Firm* — Oblon, McClelland, Maier & Neustadt, L.L.P.

(57) ABSTRACT

Aspects of the disclosure provide methods and an apparatus to transmit with resources overlapped. For example, the apparatus can include receiving circuitry, processing circuitry, and transmitting circuit. The receiving circuitry receives a grant of an uplink resource for an uplink transmission from a base station at a user equipment (UE). The processing circuitry determines a sidelink resource for a sidelink transmission based on a grant from the base station or an autonomous selection by the UE. The transmitting circuitry prioritizes the uplink transmission with the uplink resource over the sidelink transmission with the sidelink resource when the sidelink resource overlaps the uplink resource and a message of a random access channel (RACH) procedure is to be transmitted.

6 Claims, 13 Drawing Sheets

(56) References Cited

U.S. PATENT DOCUMENTS

2019/0364590 A1\* 11/2019 Sartori .................. H04W 72/14
2020/0015255 A1   1/2020 Khoryaev et al.
2020/0059944 A1\* 2/2020 Lee .................... H04W 72/1242
2020/0245364 A1\* 7/2020 Kim .................... H04W 74/004

OTHER PUBLICATIONS

International Search Report and Written Opinion dated Jun. 29, 2020 in PCT/CN2020/081643, citing documents AA-AC, AO-AP, and AX-AY therein, 9 pages.
LG Electronics Inc., "Introduction of V2X feature in 36.300," 3GPP TSG-RAN2 Meeting #97 R2-1702414, Feb. 2017, 5 pages.
Qualcomm Incorporated, "Summary of Coexistence Aspects in NR-V2X Study (AI 7.2.4.5)," 3GPP TSG RAN WG1 Meeting Ad-Hoc Meeting 1901 R1-1903594, Jan. 2019, 9 pages.
Combined Taiwanese Office Action and Search Report dated Nov. 27, 2020 in Patent Application No. 109110481 (with English translation of Category of Cited Documents), citing document AA therein, 8 pages.
Combined Chinese Office Action and Search Report dated Oct. 27, 2021 in Chinese Patent Application No. 202080001563.6, citing document AO therein, 6 pages.

\* cited by examiner

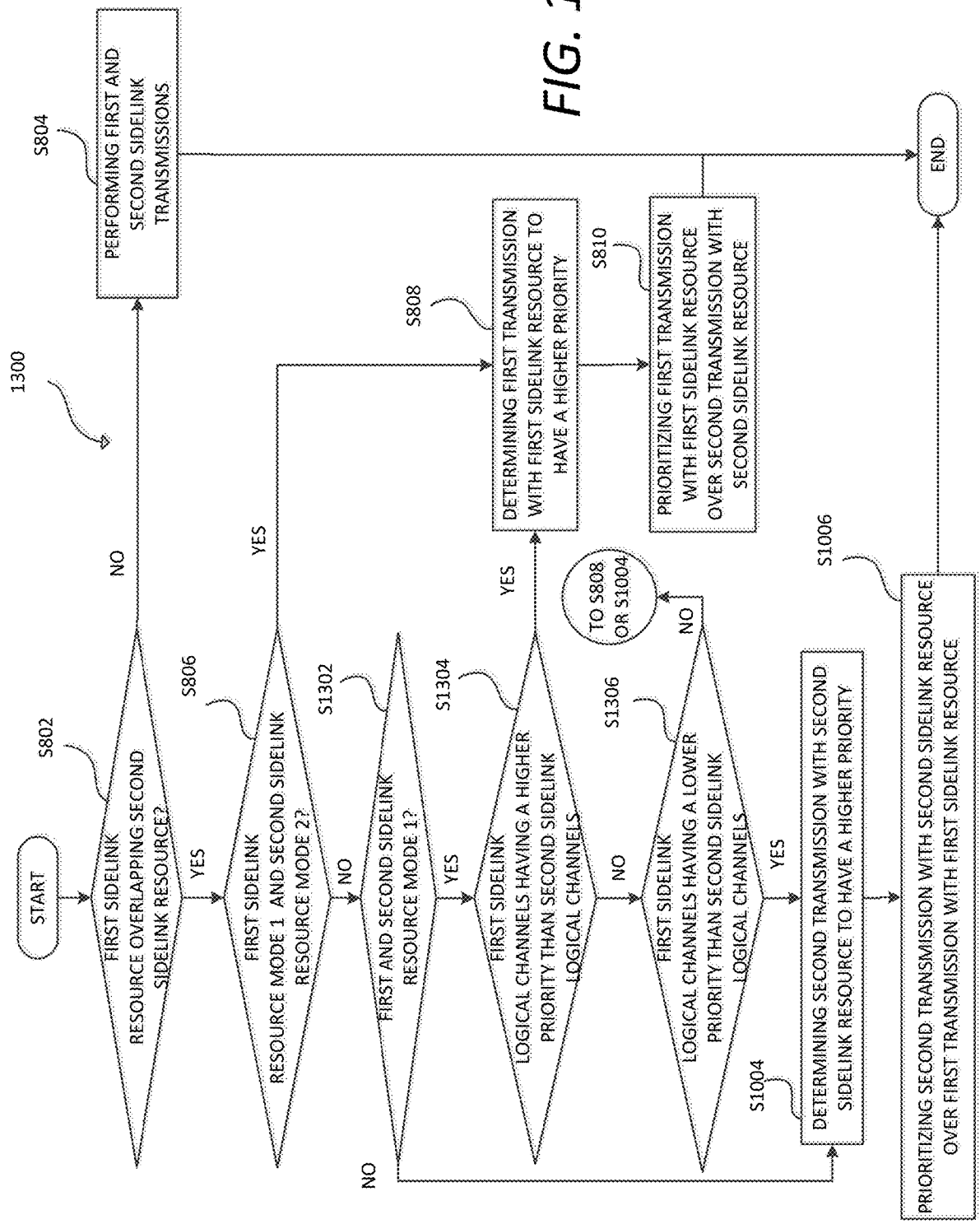

METHODS AND APPARATUS TO TRANSMIT WITH RESOURCES OVERLAPPED

INCORPORATION BY REFERENCE

This present disclosure claims the benefit of U.S. Provisional Application No. 62/825,090, "Method to handle sidelink overlapped transmission" filed on Mar. 28, 2019, which is incorporated herein by reference in its entirety.

TECHNICAL FIELD

The present disclosure relates to wireless communications, and, more particularly, to methods and apparatus to transmit with resources overlapped.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X) (e.g., LTE V2X and NR V2X) is a radio access technology developed by the Third Generation Partner Project (3GPP) to support advanced vehicular applications. In V2X, a user equipment (UE) can communicate with a base station with an uplink resource, and communicate with another UE directly with a sidelink resource.

SUMMARY

Aspects of the disclosure provide a method to transmit with uplink and sidelink resources overlapped. In an embodiment, the method includes receiving a grant of an uplink resource for an uplink transmission from a base station at a UE, determining a sidelink resource for a sidelink transmission based on a grant from the base station or an autonomous selection by the UE, the sidelink resource overlapping the uplink resource, and prioritizing the uplink transmission with the uplink resource over the sidelink transmission with the sidelink resource when a message of a random access channel (RACH) procedure is to be transmitted.

In an embodiment, the RACH procedure is a four-step RACH procedure, and the message is Msg3. In another embodiment, the RACH procedure is a two-step RACH procedure, and the message is MsgA.

In an embodiment, no message of the RACH procedure is to be transmitted, and the method further includes prioritizing the sidelink transmission with the sidelink resource over the uplink transmission with the uplink resource when the sidelink transmission has a higher priority than the uplink transmission, prioritizing the uplink transmission with the uplink resource over the sidelink transmission with the sidelink resource when the uplink transmission has a higher priority than the sidelink transmission; and prioritizing the uplink transmission with the uplink resource over the sidelink transmission with the sidelink resource or prioritizing the sidelink transmission with the sidelink resource over the uplink transmission with the uplink resource when the uplink transmission has a same priority as the sidelink transmission.

In another embodiment, no message of the RACH procedure is to be transmitted, and the method further includes prioritizing the sidelink transmission with the sidelink resource over the uplink transmission with the uplink resource when the sidelink transmission has a higher or equal priority than a priority threshold, and prioritizing the uplink transmission with the uplink resource over the sidelink transmission with the sidelink resource when the sidelink transmission has a lower priority than the priority threshold.

Aspects of the disclosure further provide an apparatus to transmit with uplink and sidelink resources overlapped. In an embodiment, the apparatus includes receiving circuitry configured to receive a grant of an uplink resource for an uplink transmission from a base station, processing circuitry configured to determine a sidelink resource for a sidelink transmission based on a grant from the base station or autonomously select the sidelink resource, the sidelink resource overlapping the uplink resource, and transmitting circuitry configured to prioritize the uplink transmission with the uplink resource over the sidelink transmission with the sidelink resource when a message of a random access channel (RACH) procedure is to be transmitted Aspects of the disclosure further provide another method to transmit with sidelink resources overlapped. In an embodiment, the method includes determining, by a UE, whether a first sidelink resource for a first sidelink transmission overlaps a second sidelink resource for a second sidelink transmission, determining the first sidelink transmission with the first sidelink resource to have a higher priority when the first sidelink resource and the second sidelink resource overlap and when the first sidelink resource is allocated by a base station and the second sidelink resource is allocated autonomously by the UE, and prioritizing the first sidelink transmission with the first sidelink resource over the second sidelink transmission with the second sidelink resource when the first sidelink transmission has the higher priority.

In an embodiment, both the first and second sidelink resources are allocated by the base station, and the method further includes determining the first sidelink transmission with the first sidelink resource to have a higher priority when the first sidelink resource is dynamically allocated by the base station and the second sidelink resource is periodically allocated by the base station, and prioritizing the first sidelink transmission with the first sidelink resource over the second sidelink transmission with the second sidelink resource when the first sidelink transmission has the higher priority.

In another embodiment, both the first and second sidelink resources are periodically allocated by the base station, and the method further includes determining the first sidelink transmission with the first sidelink resource to have a higher priority when the first sidelink resource has an earlier starting symbol, a shorter periodicity and/or a shorter duration than the second sidelink resource, and prioritizing the first sidelink transmission with the first sidelink resource over the second sidelink transmission with the second sidelink resource when the first sidelink transmission has the higher priority.

In various embodiments, the method further includes determining the first sidelink transmission with the first sidelink resource to have a higher priority when sidelink data to be transmitted by the first sidelink resource are associated with a higher-priority sidelink logical channel than sidelink data to be transmitted by the second sidelink resource, and prioritizing the first sidelink transmission with the first sidelink resource over the second sidelink transmission with the second sidelink resource when the first sidelink transmission has the higher priority.

BRIEF DESCRIPTION OF THE DRAWINGS

Various embodiments of this disclosure that are proposed as examples will be described in detail with reference to the following figures, wherein like numerals reference like elements, and wherein:

FIG. 13 is a flow chart of yet another exemplary method to transmit with two sidelink resources overlapped according to some embodiments of the disclosure.

DETAILED DESCRIPTION OF EMBODIMENTS

In a wireless communication system implemented as specified in 3GPP Long Term Evolution (LTE) standard or 3GPP New Radio (NR) standard, a user equipment (UE) can be allocated with an uplink resource and a sidelink resource, or be allocated with two sidelink resources at the same time. On occasion, the uplink resource and the sidelink resource and/or the two sidelink resources overlap. In such scenarios, if the UE is capable of transmitting both at the same time, the UE has to select one of the overlapped sidelink and uplink resources, or one of the two overlapped sidelink resources to transmit. Aspects of the disclosure provide a method and an apparatus to transmit with uplink and sidelink resources that are overlapped. The method can prioritize one of an uplink transmission with the uplink resource and a sidelink transmission with the sidelink resource by determining, among other things, whether a message of a random access channel (RACH) procedure is to be transmitted, which one of the uplink transmission and the sidelink transmission has a higher priority, and whether the sidelink transmission has a higher priority than a priority threshold. Aspects of the disclosure further provide another method to transmit with two sidelink resources overlapped. The method can prioritize one of a first sidelink transmission with a first sidelink resource and a second sidelink transmission with a second sidelink resource by determining, among other things, whether the first and second sidelink resources are allocated by a base station or are selected autonomously by a UE, whether the first and second sidelink resources are allocated dynamically or periodically by the base station, whether one of the first and second sidelink resources has an earlier starting symbol, a shorter periodicity and/or a shorter duration than the other, and whether one of the first and second sidelink resources is used to transmit sidelink data associated with a higher-priority sidelink logical channel.

Figure 1:
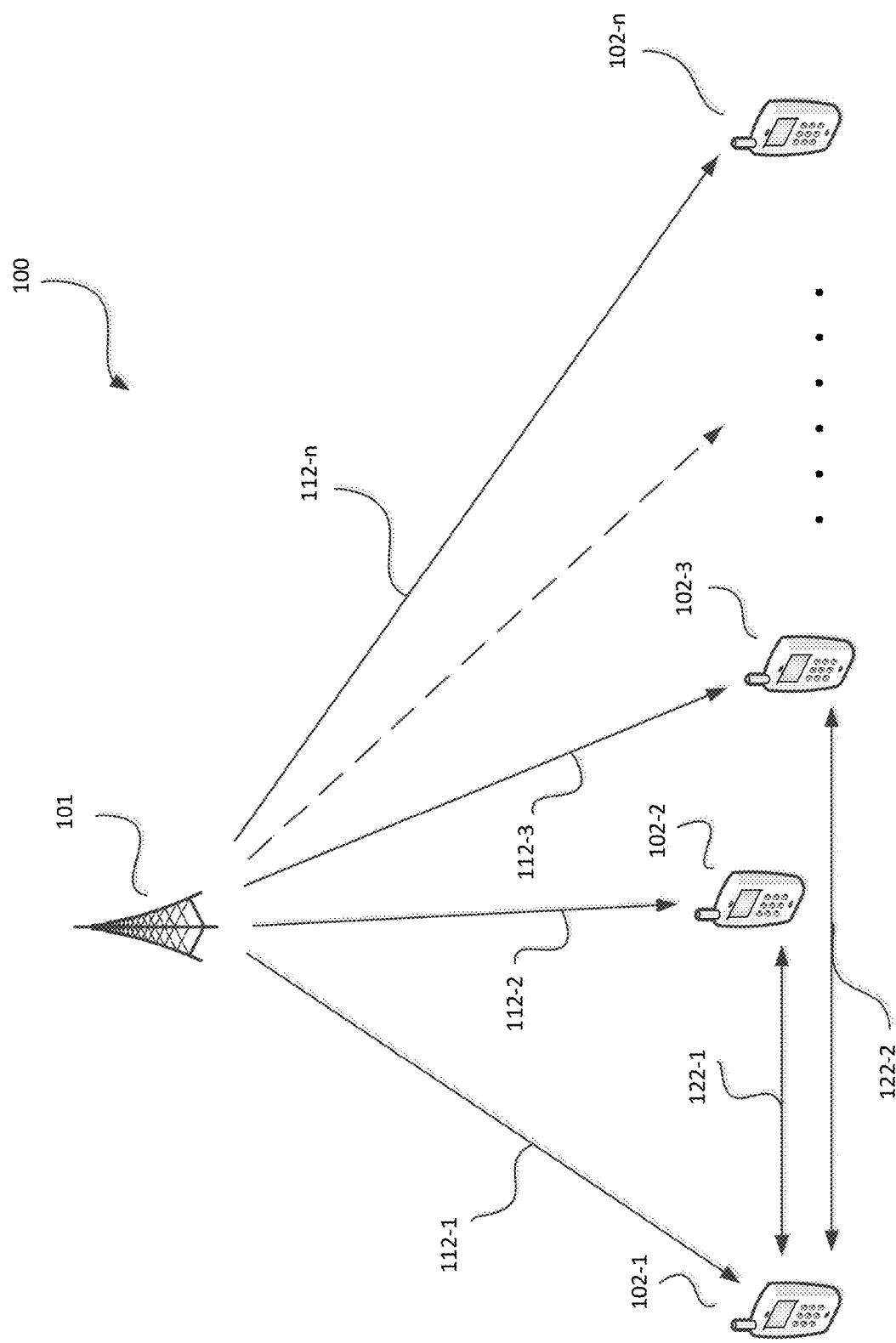
FIG. 1 shows a diagram of an exemplary wireless communication system according to some embodiments of the disclosure.

FIG. 1 shows a diagram of an exemplary wireless communication system 100 according to some embodiments of the disclosure. The wireless communication system 100 can include a base station 101, a first UE 102-1, a second UE 102-2, a third UE 102-3, . . . , and an nth UE 102-n. As shown, the base station 101 and the UEs 102 can wirelessly communicate with each other via radio interfaces (referred to as Uu interfaces, e.g., uplink radio interfaces) 112-1, 112-2, 112-3, . . . , 112-n, respectively, and the UEs 102 can also wirelessly communicate with each other via radio interfaces (referred to as PC5 interfaces, e.g., sidelink radio interfaces) 122-1 and 122-2.

The base station 101 can be any device that wirelessly communicates with the UEs 102 via uplink radio interfaces 112. For example, the base station 101 can be an implementation of a gNB specified in the 3GPP New Radio (NR) standard. Alternatively, the base station 101 can be an implementation of an eNB specified in 3GPP Long Term Evolution (LTE) standard. Accordingly, the base station 101 can communicate with the UEs 102 via the uplink radio interfaces 112 according to respective wireless communication protocols. In yet other embodiments, the base station 101 can implement other types of standardized or non-standardized radio access technologies, and communicate with the UEs 102 according to the respective radio access technologies.

The UEs 102 can be any device that is capable of wirelessly communicating with the base station 101 via the uplink radio interfaces 112, as well as communicating with the UEs 102 via the sidelink radio interfaces 122. For example, the UEs 102 can be a vehicle, a computer, a mobile phone, and the like. The sidelink radio interfaces 122 can be a direct radio link established between the UEs 102. In V2X, the sidelink communication includes vehicle to vehicle (V2V) communication, mobile phone to mobile phone communication, device to device (D2D) communication, and the like. For example, as shown in FIG. 1, the first UE 102-1 can communicate with the second UE 102-2 and the third UE 102-3 via the first sidelink radio interface 122-1 and the second sidelink radio interface 122-2, respectively.

Further, according to an aspect of the disclosure, each of the UEs 102 can be allocated with an uplink resource and a sidelink resource, or be allocated with two sidelink resources at the same time, and can transmit with these uplink and sidelink resources to the base station 101 and the rest of the UEs 102. For example, the first UE 102-1 can be allocated with an uplink resource and a sidelink resource, and can transmit with the uplink resource and the sidelink resource to the base station 101 and the second UE 102-2, respectively.

Further, according to an aspect of the disclosure, the base station 101 can allocate the uplink resource and the sidelink resource. In some other embodiments, the UEs 102 can select their respective sidelink resources by themselves autonomously. For example, the first UE 102-1 can select a first sidelink resource and a second sidelink, and transmit with the first sidelink resource and the second sidelink resource to the second UE 102-2 and the third UE 102-3, respectively.

Figure 2:
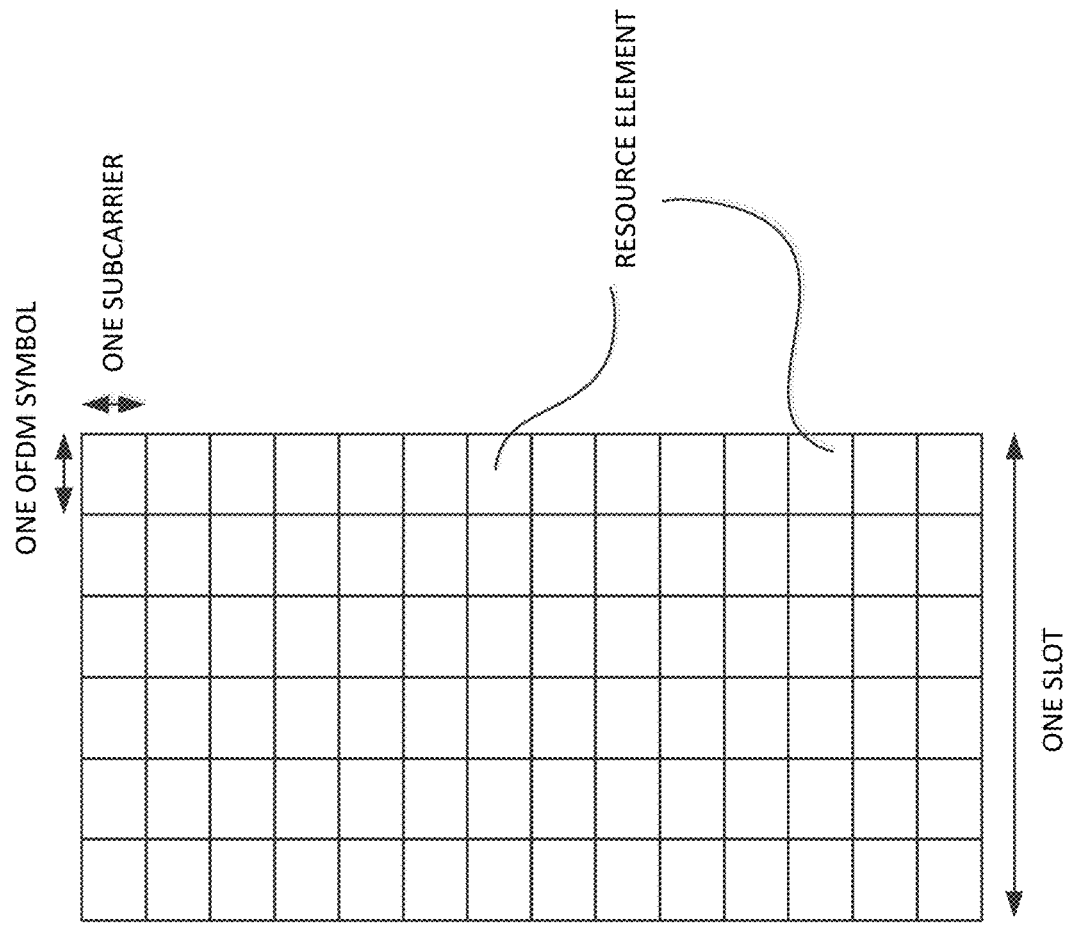
FIG. 2 shows an exemplary resource block allocated in a wireless communication system according to some embodiments of the disclosure.

FIG. 2 shows an exemplary resource block allocated in a wireless communication system according to some embodiments of the disclosure. In the wireless communication system 100, information is organized as a function of frequency and time, using a resource grid. In the resource grid, the basic unit is a resource element (RE), which spans one symbol (e.g., 66.7 ns) by one sub-carrier (e.g., 15 kHz). Resource elements are grouped into resource blocks (RBs). Each of the resource blocks spans 0.5 ms (one slot) by 180 kHz (12 sub-carriers). One slot is composed of seven symbols with normal cyclic prefix or six symbols with extended cyclic prefix. Resources are allocated to the UEs 102 in units of resource blocks.

In operation, the base station 101 can allocate uplink resources and sidelink resources to the UEs 102. The UEs 102 can also select sidelink resources autonomously. The first UE 102-1, for example, can then perform an uplink transmission with an uplink resource (e.g., allocated by the base station 101) via the first uplink radio interface 112-1 and a sidelink transmission with a sidelink resource (e.g., allocated by the base station 101 or autonomously selected by the first UE 102-1) via the first sidelink radio interface 122-1.

Figure 3:
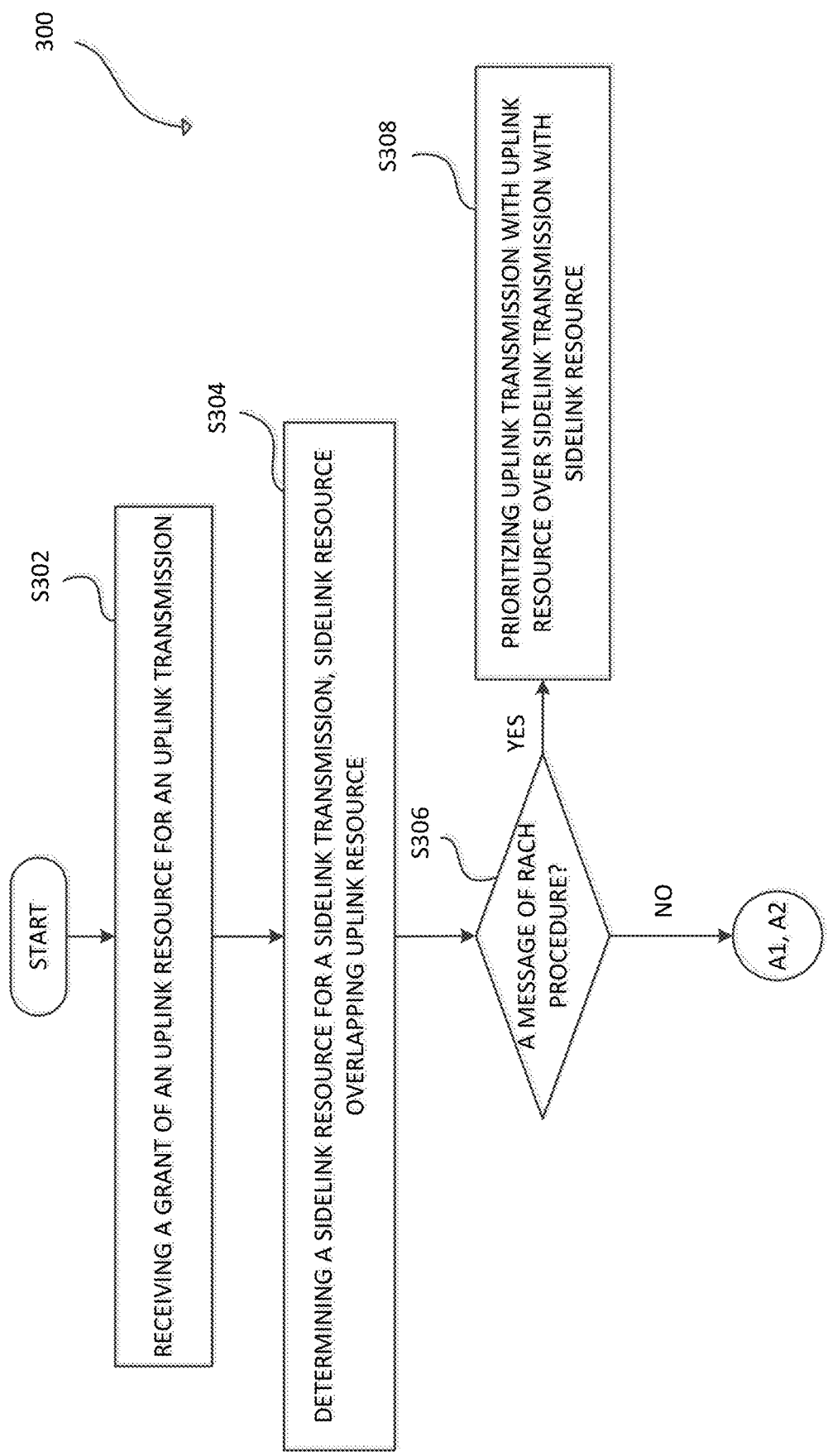
FIG. 3 is a flow chart of an exemplary method to transmit with uplink and sidelink resources overlapped according to some embodiments of the disclosure.

On occasion, the uplink resource may overlap the sidelink resource in time domain. In such a scenario, the first UE 102-1 has to determine a prioritization of the uplink transmission and the sidelink transmission. FIG. 3 is a flow chart of an exemplary method 300 for the first UE 102-1 to transmit with uplink and sidelink resources that are overlapped according to some embodiments of the disclosure.

At step S302, the first UE 102-1 receives a UL grant of an uplink resource for an uplink transmission from the base station 101. At step S304, the first UE 102-1 determines a sidelink resource for a sidelink transmission, the sidelink resource overlapping the uplink resource. In an embodiment, the sidelink resource can be allocated by the base station 101. In another embodiment, the first UE 102-1 can select the sidelink resource autonomously. In an embodiment, the first UE 102-1 can first determine a sidelink resource for a sidelink transmission, and then receive a UL grant of an uplink resource for an uplink transmission from the base station 101, wherein the uplink resource overlaps the sidelink resource.

The first UE 102 then determines whether a message of a random access channel (RACH) procedure is to be transmitted, at step S306. When the message of the RACH procedure is to be transmitted, the first UE 102-1 prioritizes the uplink transmission with the uplink resource over the sidelink transmission with the sidelink resource, at step S308. The first UE 102-1 transmits the message with the uplink resource to the base station 101. When no message of the RACH procedure is to be transmitted, the method 300 can proceed to A1 (shown in FIG. 5) or A2 (shown in FIG. 6).

Figure 4:
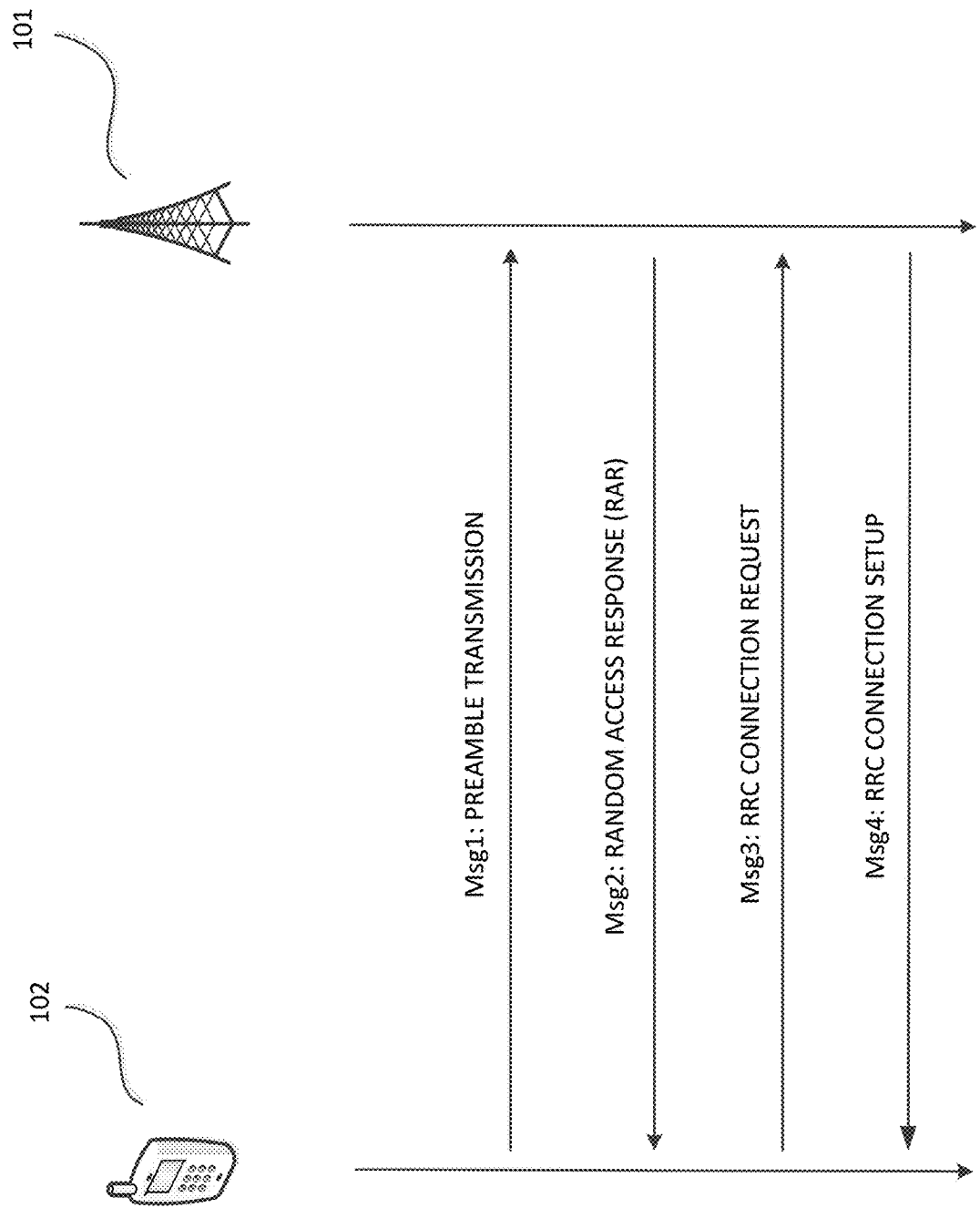
FIG. 4 shows an exemplary four-step random access channel (RACH) procedure between a user equipment and a base station in a wireless communication system according to some embodiments of the disclosure.

FIG. 4 shows an LTE four-step random access channel (RACH) procedure between the first UE 102-1 and the base station 101 in the wireless communication system 100 according to some embodiments of the disclosure. If the first UE 102-1 wishes to transmit on the PUSCH but does not have the resources to do so, then it can send a scheduling request on the PUCCH. If the first UE 102 does not have the PUCCH to do the sending (e.g., the first UE 102-1 is in RRC_IDLE state, or is in RRC_CONNECTED state but has lost uplink timing synchronization with the base station 101), then it can initiate a random access procedure, by sending a PRACH transmission to the base station 101. The first UE 102-1 can transmit a preamble as Msg1 to the base station 1. The base station 101 responds with Msg2 random access response (RAR) containing a temporary cell-RNTI (C-RNTI), a timing advance (TA) and an uplink resource grant upon Msg1 success. The uplink resource grant schedules a PUSCH transmission from the first UE 102-1, known as Msg3. In Msg3, after decoding the RB assignment from Msg2, the first UE 102-1 transmits a radio resource control (RRC) connection request including an initial identity (temporary C-RNTI). In Msg4, the base station 101 sends RRC connection setup with a permanent C-RNTI and an echo of the initial identity transmitted in Msg3 by the first UE 102-1. In NR, although with detailed configuration difference, the NR four-step random access channel (RACH) procedure has exactly the same signaling flow as that of LTE four-step RACH procedure.

In an embodiment, the RACH procedure is the four-step RACH procedure, and the message is Msg3. Accordingly, when determining that Msg3 is to be transmitted, at step S306, the first UE 102-1 transmits Msg3 with the uplink resource, at step S308.

The four-step RACH procedure requires two round-trip cycles between the first UE 102-1 and the base station 101, which not only increases the latency but also incurs additional control-signaling overhead. A two-step RACH procedure has a single round-trip cycle between the first UE 102-1 and the base station 101, by combining the preamble (Msg1) and the scheduled PUSCH transmission (Msg3) into a single message to be transmitted from the first UE 102-1, known as MsgA, and combining the Msg2 RAR with Msg4 into another single message to be transmitted from the base station 101 to the first UE 102-1, known as MsgB. In another embodiment, the RACH procedure is the two-step RACH procedure, and the message is MsgA.

The UEs 102 can transmit sidelink buffer status report (BSR) control elements to the base station 101, telling the base station 101 about the amount of sidelink data the UEs 102 have available for transmission. The UEs 102 transmit the sidelink BSR if for a destination UE, sidelink data become available for transmission when the sidelink transmit buffers were previously empty, if for a destination UE, sidelink data become available for transmission on a logical channel with a higher priority than those previously stored in the buffers, or if a timer expires while sidelink data are waiting for transmission. In an embodiment, the first UE 102-1 can further determine, at step S306, whether a sidelink BSR is to be transmitted to the base station 101. When the sidelink BSR is to be transmitted via the uplink resource, the first UE 102-1 also prioritizes the uplink transmission with the uplink resource over the sidelink transmission with the sidelink resource, at step S308. The first UE 102-1 transmits the sidelink BSR with the uplink resource to the base station 101. In an embodiment, different thresSL-TxPrioritization values are configured for unicast type, groupcast type and broadcast type. Based on the cast type of the sidelink transmission, the first UE 102-1 can select the threshold corresponding to the cast type of the sidelink transmission to determine whether the sidelink transmission has a higher or lower priority than the overlapped uplink transmission. In another embodiment, different thresSL-TxPrioritization values are also configured for network scheduled transmission resource and for UE autonomous transmission resource. Based on the scheduling mode of the sidelink transmission, the first UE 102-1 can select the threshold corresponding to the scheduling mode of the sidelink transmission to determine whether the sidelink transmission has a higher or lower priority than the overlapped uplink transmission.

Figure 5:
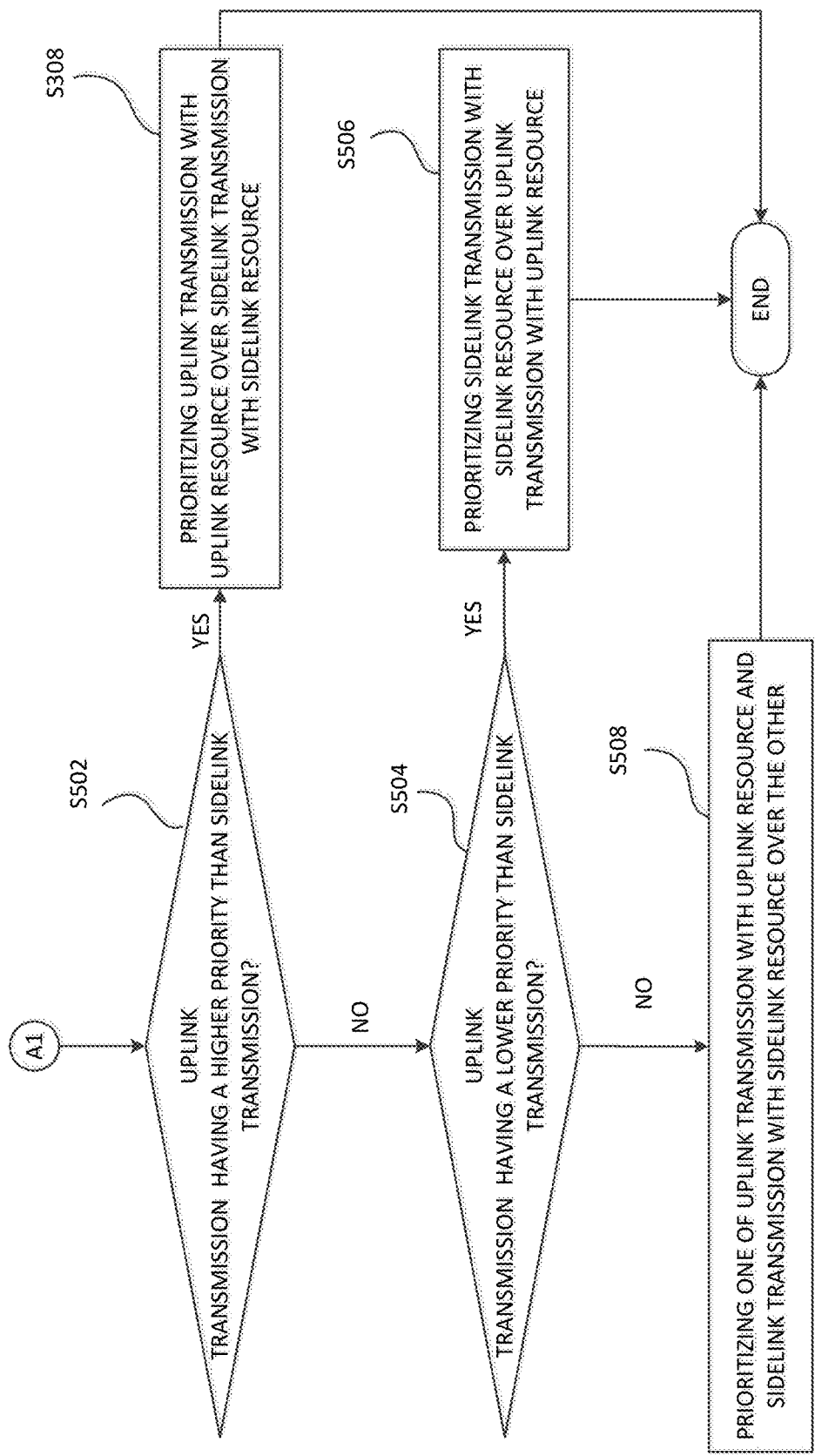
FIGS. 5 and 6 are flow charts of the method of FIG. 3 after determining no message of the RACH procedure is to be transmitted according to some embodiments of the disclosure.

The method 300 of FIG. 3 can proceed to A1 (shown in FIG. 5) or A2 (shown in FIG. 6) when it is determined, at step S306, that no message of the RACH procedure is to be transmitted. FIG. 5 is a flow chart of the method 300 after determining that no message of the RACH procedure is to be transmitted according to some embodiments of the disclosure. FIG. 5 follows A1 of FIG. 3. When the first UE 102-1 determines, at step S306, that no message (e.g., Msg3 and MsgA) of the RACH procedure is to be transmitted, it then determines whether the uplink transmission has a higher priority than the sidelink transmission, at step S502. When the uplink transmission has a higher priority than the sidelink transmission, the method 300 proceeds to step S308, that is prioritizing the uplink transmission with the uplink resource is prioritized over the sidelink transmission with the sidelink resource. When the uplink transmission does not have a higher priority than the sidelink transmission, the method 300 proceeds to step S504, at which whether the uplink transmission has a lower priority than the sidelink transmission is determined. When the uplink transmission has a lower priority than the sidelink transmission, the method 300 prioritizes the sidelink transmission with the sidelink resource over the uplink transmission with the uplink resource, at step S506; otherwise, the method 300 can prioritize the sidelink transmission with the sidelink resource over the uplink transmission with the uplink resource, or prioritize the uplink transmission with the uplink resource over the sidelink transmission with the sidelink resource, at step S508.

Figure 6:
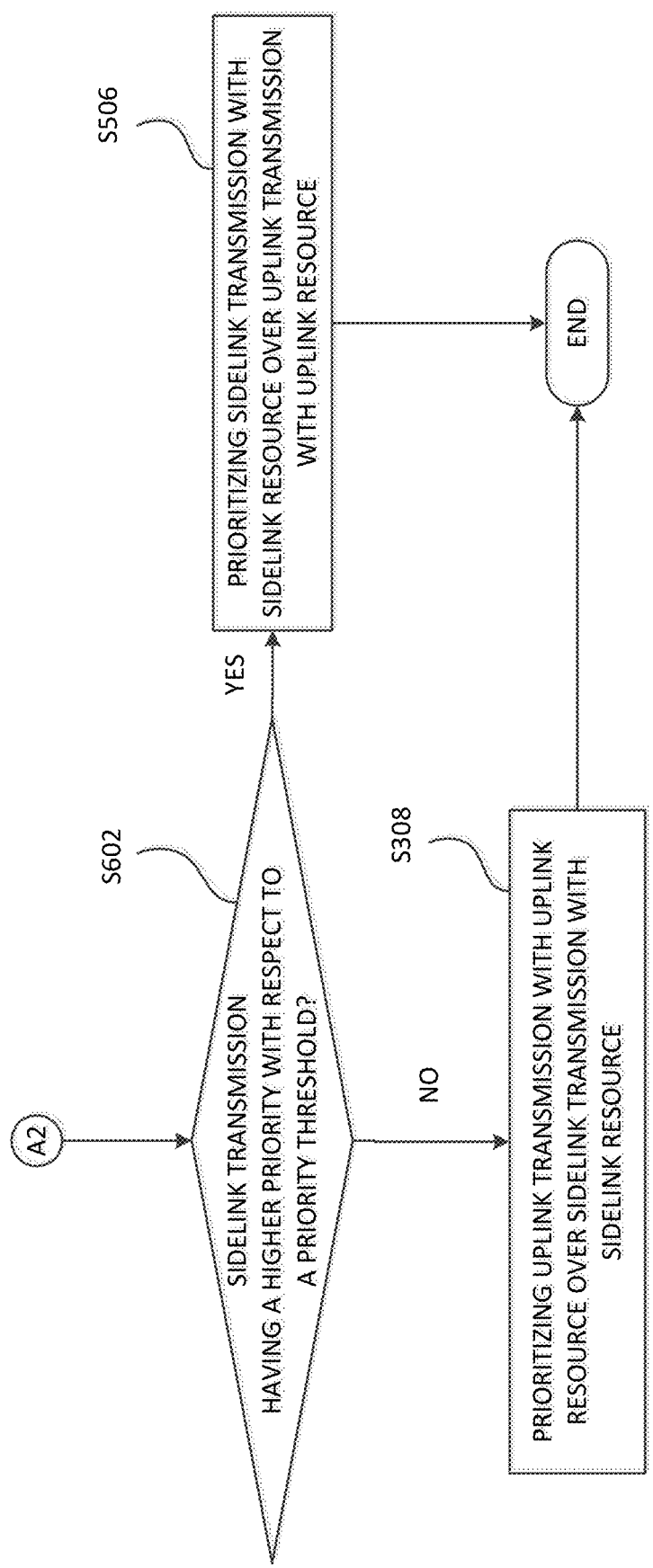

FIG. 6 is a flow chart of the method 300 after determining that no message of the RACH procedure is to be transmitted according to some embodiments of the disclosure. FIG. 6 follows A2 of FIG. 3. When the first UE 102-1 determines, at step S306, that no message of the RACH procedure is to be transmitted, it then determines, at step S602, whether the sidelink transmission has a higher priority with respect to a priority threshold in an embodiment that at least one of the uplink transmission and the sidelink transmission is implemented. In an embodiment, the priority threshold can be configured by the base station 101. When the sidelink transmission has a higher priority with respect to the priority threshold, the method 300 proceeds to step S506, that is prioritizing the sidelink transmission with the sidelink resource over the uplink transmission with the uplink resource. When the sidelink transmission does not have a higher priority or has a lower priority with respect to the priority threshold, the method 300 proceeds to step S308, that is prioritizing the uplink transmission with the uplink resource over the sidelink transmission with the sidelink resource. For example, when the base station 101 configures a priority threshold to be sidelink logical channel priority 5, and the sidelink transmission includes traffic with at least one sidelink logical channel having a priority from 1 to 5, the first UE 102-1 prioritizes the sidelink transmission with the sidelink resource over the uplink transmission with the uplink resource. When the sidelink transmission includes traffic with all sidelink logical channels having priorities from 6 to 9, the first UE 102-1 prioritizes the uplink transmission with the uplink resource over the sidelink transmission with the sidelink resource.

In another embodiment, both the uplink and sidelink transmissions are implemented as specified in 3GPP NR standards, and two priority thresholds can be configured, one for the sidelink transmission, the other for the uplink transmission. The first UE 102-1 determines a prioritization of the uplink transmission and the sidelink transmission based on an inequality: High Priority UL>High Priority SL>Low Priority UL>Low Priority SL. For example, the first UE 102-1 prioritizes the uplink transmission with the uplink resource over the sidelink transmission with the sidelink resource when the uplink transmission has a higher priority with respect to an uplink priority threshold (High Priority UL) or the sidelink transmission has a lower priority with respect to a sidelink priority threshold (Low Priority SL), and prioritizes the sidelink transmission with the sidelink resource over the uplink transmission with the uplink resource when the uplink transmission has a lower priority with respect to the uplink priority threshold (Low Priority UL) and the sidelink transmission has a higher priority with respect to the sidelink priority threshold (High Priority SL).

Figure 7:
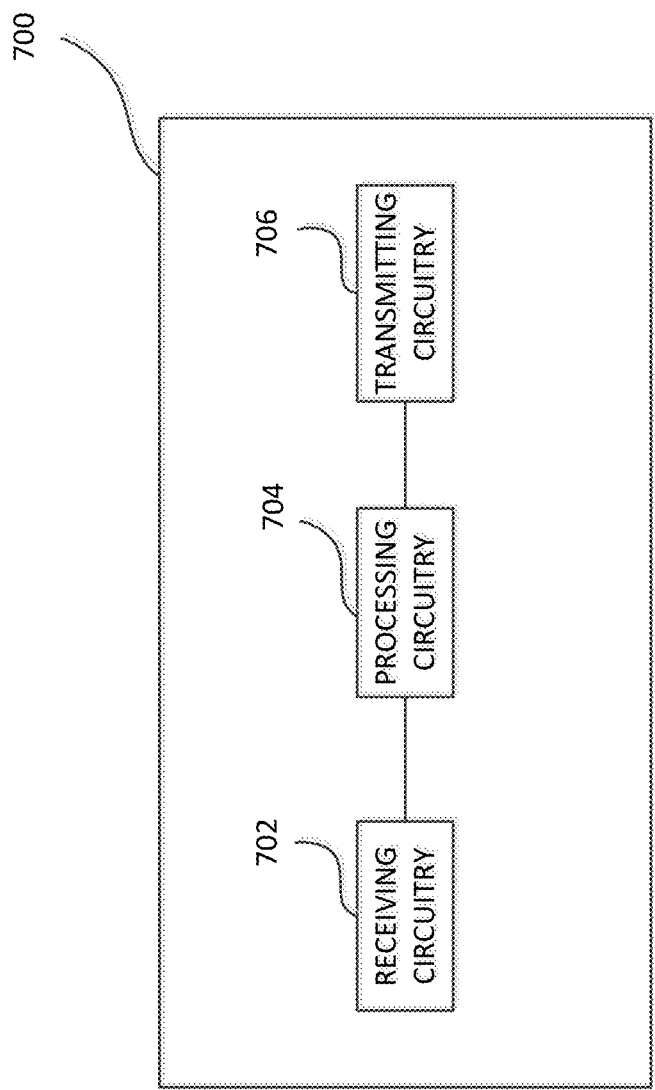
FIG. 7 is a block diagram of an exemplary apparatus to transmit with uplink and sidelink resources overlapped according to some embodiments of the disclosure.

FIG. 7 is a block diagram of an apparatus 700 to transmit with uplink and sidelink resources overlapped according to some embodiments of the disclosure. In an embodiment, the apparatus 700 can be the UEs 102. The apparatus 700 can include a receiving circuitry 702, a processing circuitry 704 and a transmitting circuitry 706. In some other embodiments, the apparatus 700 can optionally include other components, such as input and output devices, signal processing circuitry, and the like. Accordingly, the apparatus 700 can be capable of performing other additional functions, such as executing application programs, and processing alternative communication protocols.

The receiving circuitry 702 can be configured to receive a grant of an uplink resource for an uplink transmission from the base station 101.

The processing circuitry 704 can be configured to determine a sidelink resource for a sidelink transmission based on a grant from the base station, or select the sidelink resource autonomously. In an embodiment, the uplink resource overlaps the sidelink resource. In some other embodiments, the processing circuitry 704 is a central processing unit (CPU) configured to execute program instructions to perform various functions and processes described herein.

The transmitting circuitry 706 can be configured to prioritize the uplink transmission with the uplink resource over the sidelink transmission with the sidelink resource when a message of a RACH procedure is to be transmitted. In an embodiment, the transmitting circuitry 706 and the receiving circuitry 702 can be fabricated together to form a transceiver.

In an embodiment, the transmitting circuitry 706 is further configured, when no message of the RACH procedure is to be transmitted, to prioritize the sidelink transmission with the sidelink resource over the uplink transmission with the uplink resource when the sidelink transmission has a higher priority than the uplink transmission, to prioritize the uplink transmission with the uplink resource over the sidelink transmission with the sidelink resource when the uplink transmission has a higher priority than the sidelink transmission, and to prioritize the uplink transmission with the uplink resource over the sidelink transmission with the sidelink resource or prioritizing the sidelink transmission with the sidelink resource over the uplink transmission with the uplink resource when the uplink transmission has a same priority as the sidelink transmission.

In some other embodiments, the transmitting circuitry 706 is further configured, when no message of the RACH procedure is to be transmitted, to prioritize the sidelink transmission with the sidelink resource over the uplink transmission with the uplink resource when the sidelink transmission has a higher or equal priority with respect to a priority threshold configurable by the base station 101, and to prioritize the uplink transmission with the uplink resource over the sidelink transmission with the sidelink resource when the sidelink transmission has a lower priority with respect to the priority threshold.

In an embodiment, the receiving circuitry 702, the processing circuitry 704 and the transmitting circuitry 706 can be a digital signal processor (DSP), an application specific integrated circuit (ASIC), a programmable logic devices (PLD), a field programmable gate array (FPGA), a digitally enhanced circuit, or a comparable device or a combination thereof.

The first UE 102-1 can also perform a first sidelink transmission with a first sidelink resource via the first sidelink radio interface 122-1 with the second UE 102-2 and a second sidelink transmission with a second sidelink resource via the second sidelink radio interface 122-2 with the third UE 102-3. On occasion, the first sidelink resource and the second sidelink resource may overlap as well. In such a scenario, the first UE 102-1 has to determine a prioritization of the first sidelink transmission and the second sidelink transmission.

Figure 8:
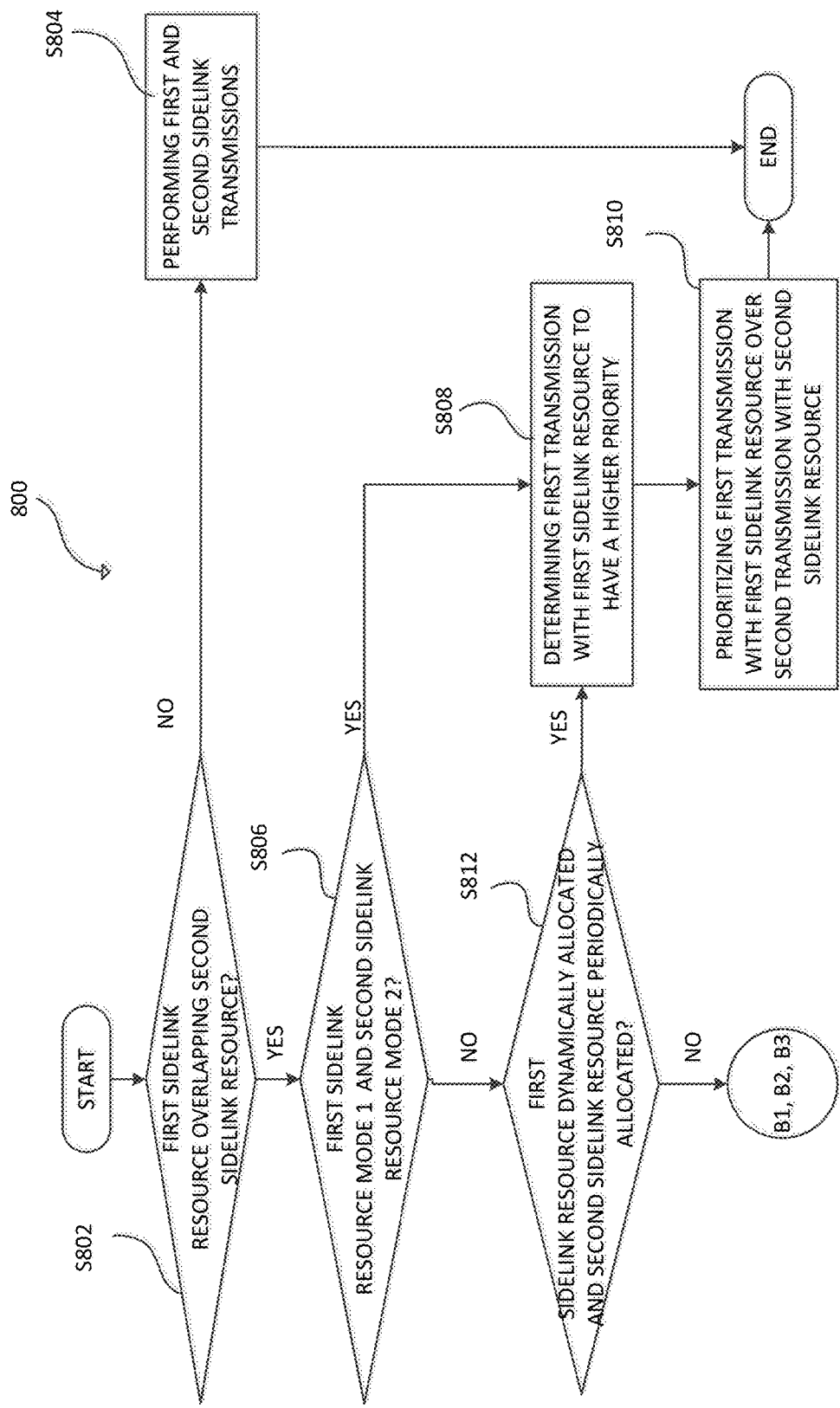
FIG. 8 is a flow chart of another exemplary method to transmit with two sidelink resources overlapped according to some embodiments of the disclosure.

FIG. 8 is a flow chart of a method 800 to transmit with first and second sidelink resources overlapped according to some embodiments of the disclosure.

At step S802, the first UE 102-1 determines whether a first sidelink resource for a first sidelink transmission overlaps a second sidelink resource for a second sidelink transmission, based on, for example, downlink control information (DCI) transmitted from the base station 101. When the first sidelink resource does not overlap the second sidelink resource, the first UE 102-1 can perform both the first sidelink transmission with the first sidelink resource and the second sidelink transmission with the second sidelink resource, at step S804. When the first sidelink resource overlaps the second sidelink resource, the method 800 proceeds to step S806.

One or both of the first sidelink resource and the second sidelink resource can be allocated by the base station 101 or allocated by the first UE 102-1 autonomously. At S806, the first UE 102-1 determines whether the first sidelink resource is allocated by the base station 101 (i.e., scheduling mode 1) and the second sidelink resource is selected by the first UE 102-1 autonomously (i.e., scheduling mode 2). In an embodiment, when the first sidelink resource is allocated by the base station 101 and the second sidelink resource is allocated by the first UE 102-1 autonomously, the first UE 102-1 determines the first sidelink transmission to have a higher priority than the second sidelink transmission, at step S808, and prioritizes the first sidelink transmission with the first sidelink resource over the second sidelink transmission with the second sidelink resource, at step S810.

Figure 9:
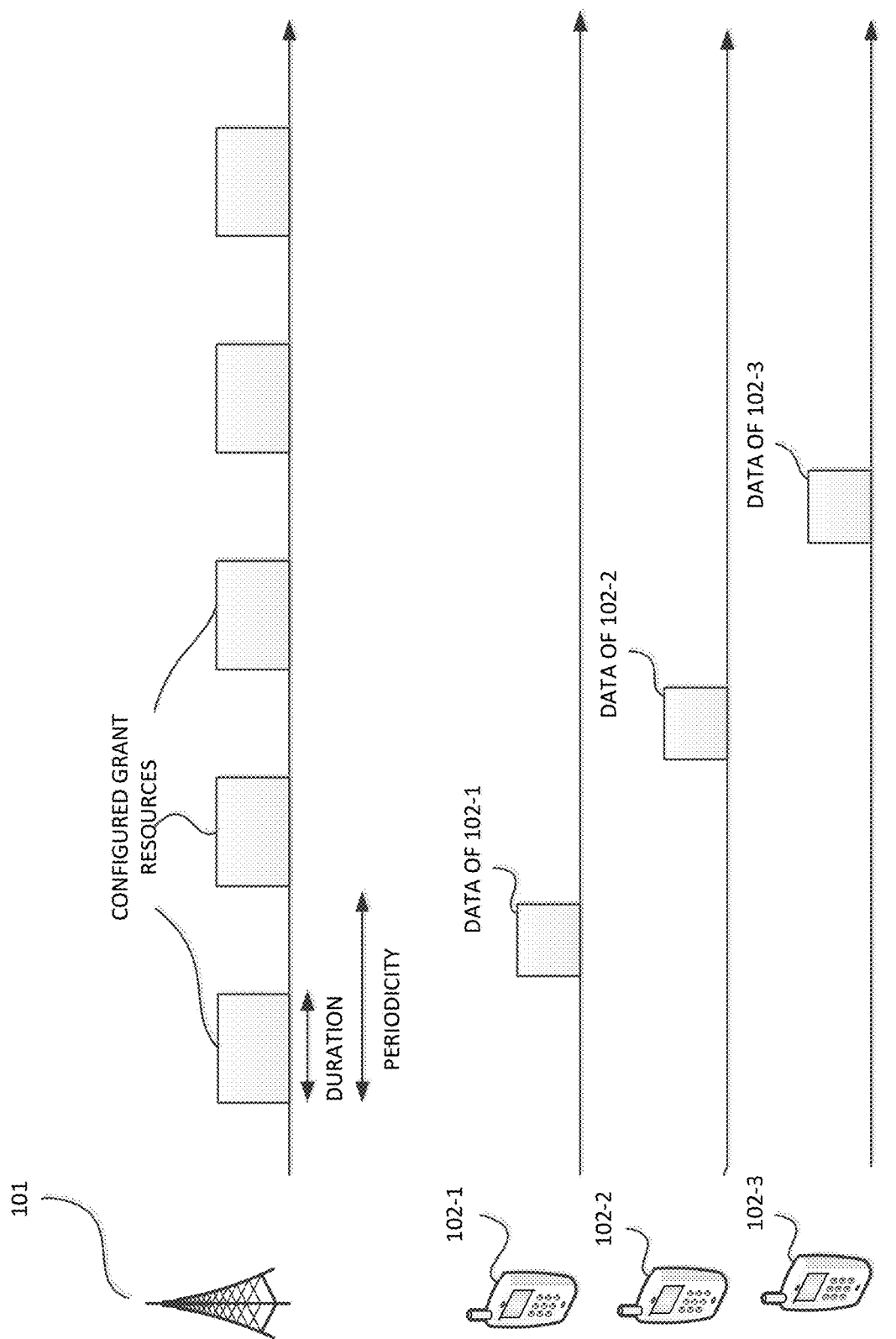
FIG. 9 shows periodically allocated resources by a base station for UEs.

When both the first and second sidelink resources are allocated by the base station 101, the method 800 proceeds to step S812. At step S812, the first UE 102-1 determines whether the first sidelink resource is dynamically allocated by the base station 101 and the second sidelink resource is periodically allocated by the base station 101. When the first sidelink resource is dynamically allocated by the base station 101 and the second sidelink resource is periodically allocated by the base station 101, the method proceeds to steps S808 and S810 sequentially, that is determining the first sidelink transmission to have a higher priority than the second sidelink transmission, at step S808, and prioritizing the first sidelink transmission with the first sidelink resource over the second sidelink transmission with the second sidelink resource, at step S810. FIG. 9 shows periodically allocated resources by the base station 101 for UEs 102.

When both the first and second resources are periodically allocated by the base station 101, the first UE 102-1 can compare the periodicities, durations and/or starting symbols of the first and second sidelink resources, in order to determine a prioritization of the first sidelink transmission and the second sidelink transmission. Accordingly, the method 800 can proceed to B1 (shown in FIG. 10), B2 (shown in FIG. 11) or B3 (shown in FIG. 12).

Figure 10:
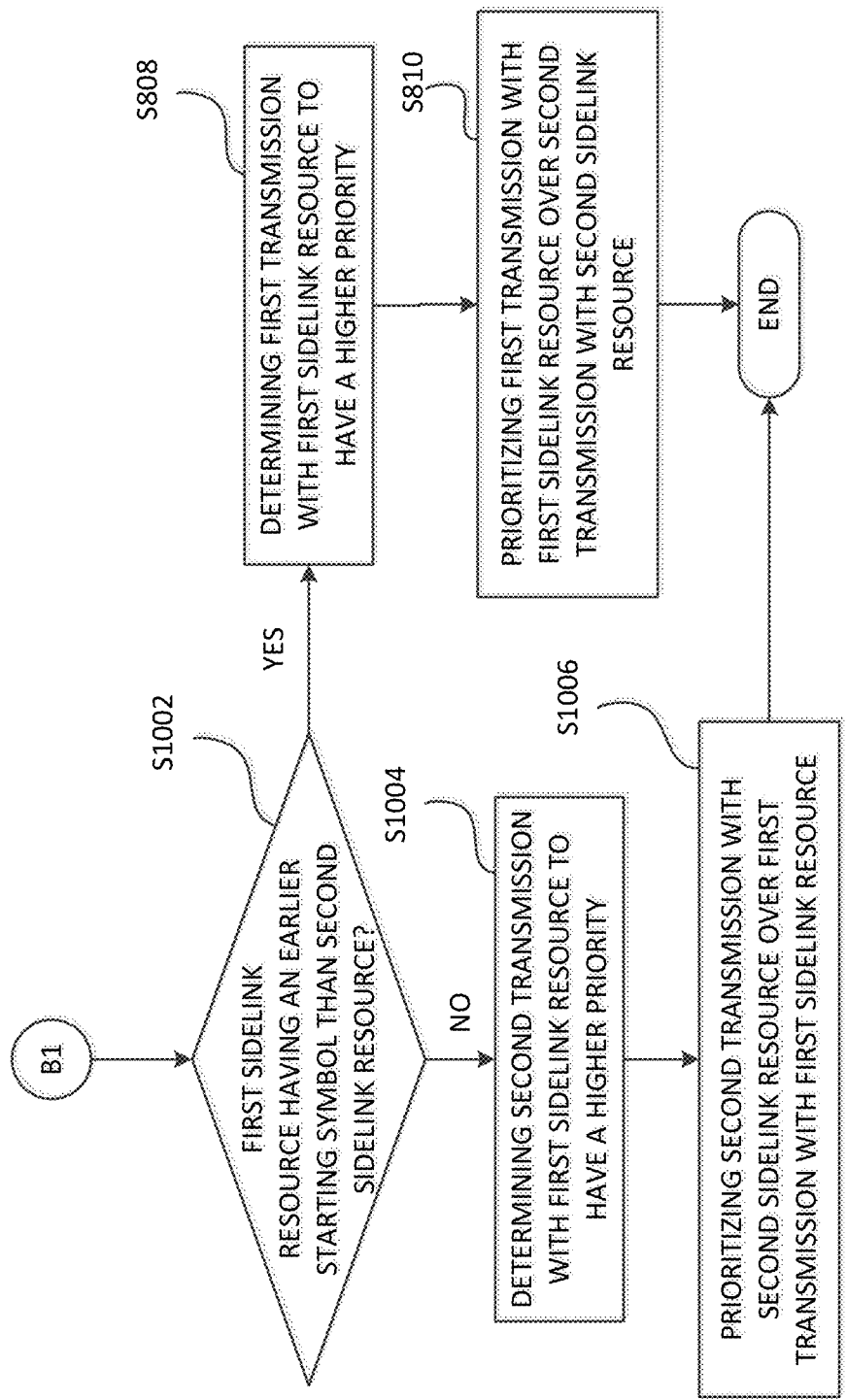
FIGS. 10-12 are flow charts of the method of FIG. 8 after determining that both the first and second resources are periodically allocated by the base station according to some embodiments of the disclosure.

FIG. 10 is a flow chart of the method 800 after determining that both the first and second resources are periodically allocated by the base station 101 according to some embodiments of the disclosure. FIG. 10 follows B1 of FIG. 8. When both the first and second sources are periodically allocated by the base station 101, the method 800 proceeds to step S1002. At step S1002, the first UE 102-1 determines whether the first sidelink resource has an earlier starting symbol than the second sidelink resource. When the first sidelink resource has an earlier starting symbol than the second sidelink resource, the method 800 proceeds to steps S808 and S810 sequentially, that is determining the first sidelink transmission to have a higher priority than the second sidelink transmission, at step S808, and prioritizing the first sidelink transmission with the first sidelink resource over the second sidelink transmission with the second sidelink resource, at step S810. When the first sidelink resource has a later starting symbol than the second sidelink resource, the first UE 102-1 determines the second sidelink transmission to have a higher priority than the first sidelink transmission, at step S1004, and prioritizes the second sidelink transmission with the second sidelink resource over the first sidelink transmission with the first sidelink resource, at step S1006.

Figure 11:
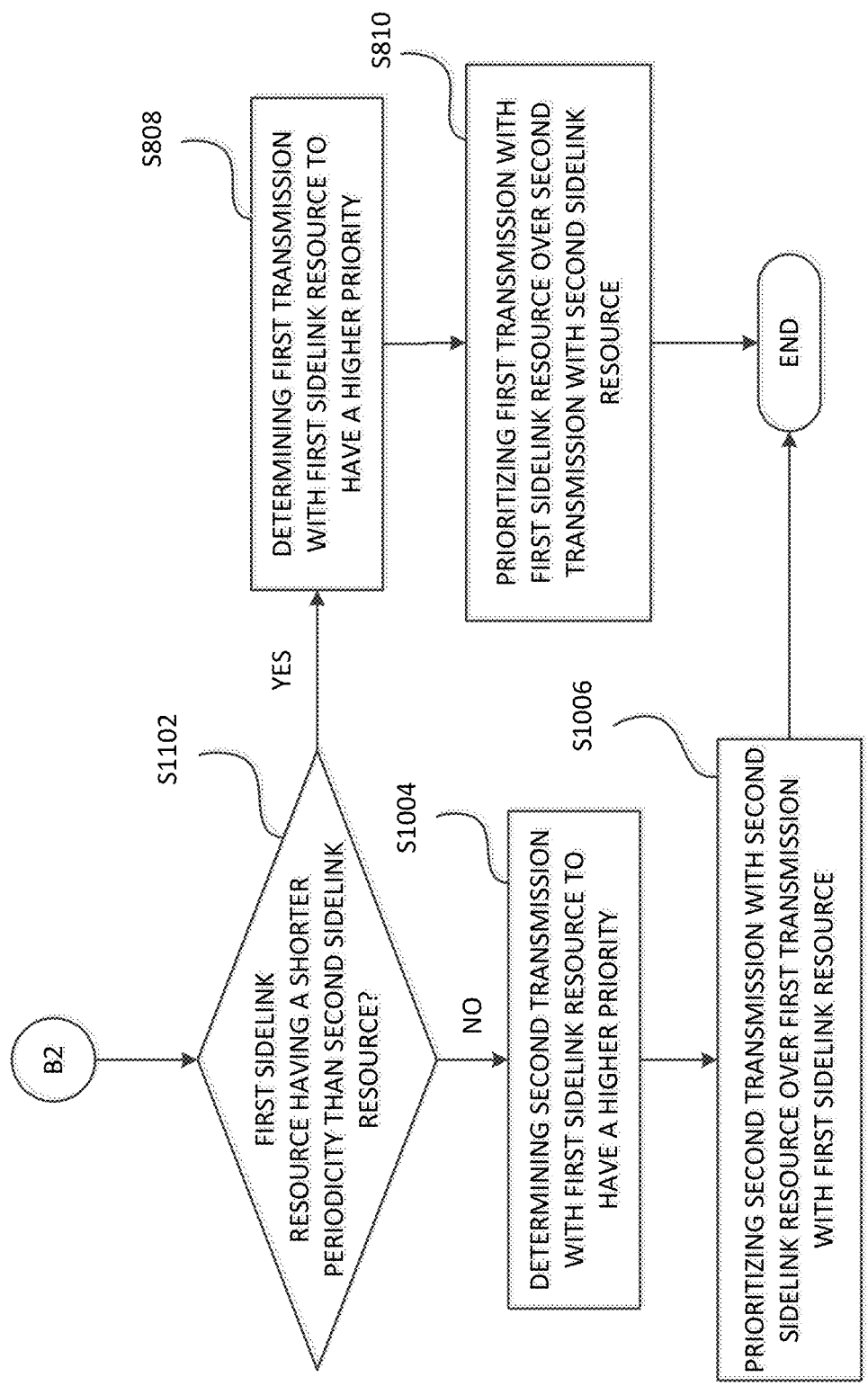

FIG. 11 is another flow chart of the method 800 after determining that both the first and second resources are periodically allocated by the base station 101 according to some embodiments of the disclosure. FIG. 11 follows B2 of FIG. 8. When both the first and second sources are periodically allocated by the base station 101, the method 800 proceeds to step S1102. At step S1102, the first UE 102-1 determines whether the first sidelink resource has a shorter periodicity than the second sidelink resource. When the first sidelink resource has a shorter periodicity than the second sidelink resource, the method 800 proceeds to steps S808 and S810 sequentially. When the first sidelink resource does not have a shorter periodicity than the second sidelink resource, the method 800 proceeds to steps S1004 and S1006 sequentially.

Figure 12:
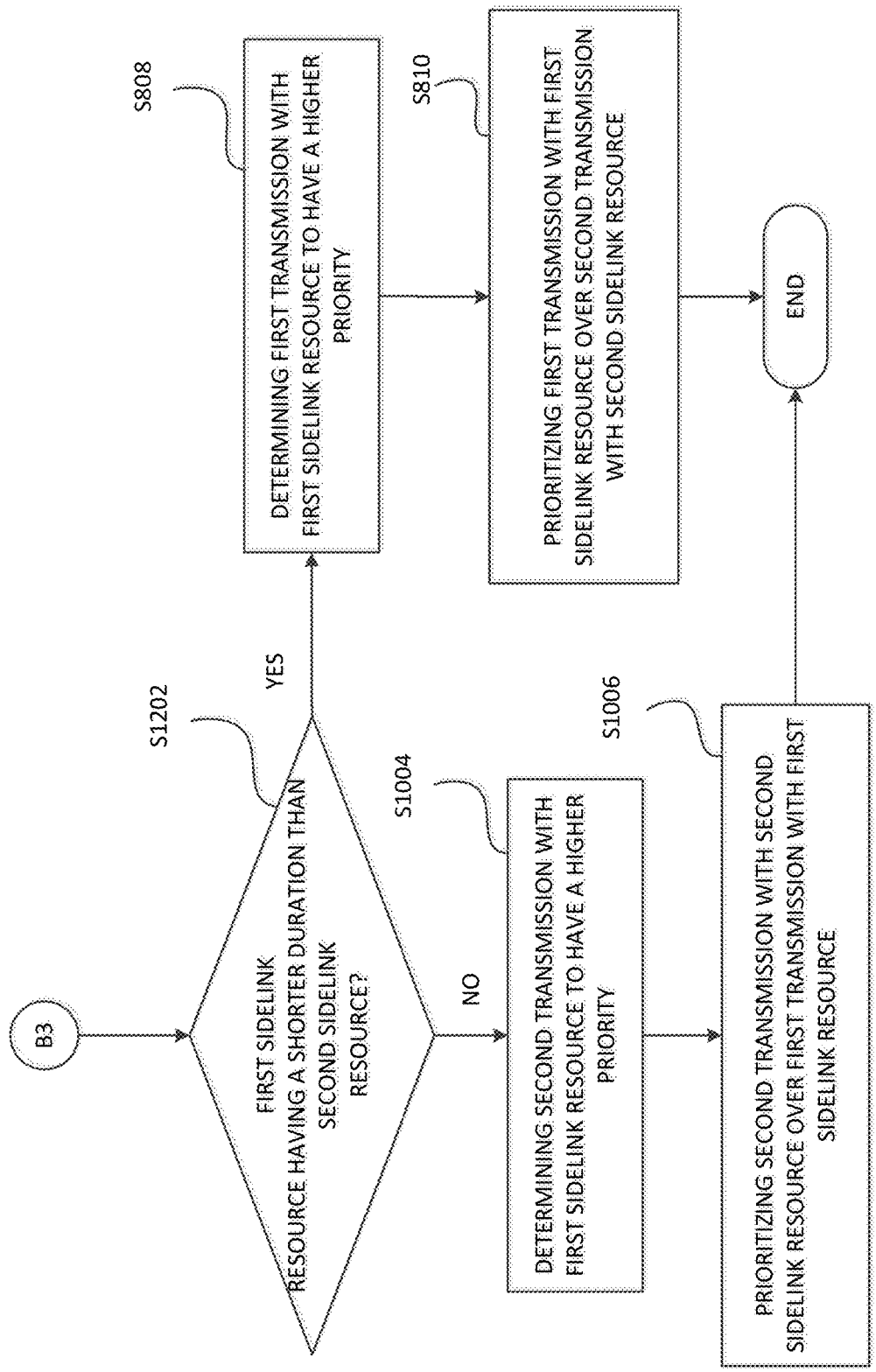

FIG. 12 is yet another flow chart of the method 800 after determining that both the first and second resources are periodically allocated by the base station 101 according to some embodiments of the disclosure. FIG. 12 follows B3 of FIG. 8. When both the first and second sources are periodically allocated by the base station 101, the method 800 proceeds to step S1202. At step S1202, the first UE 102-1 determines whether the first sidelink resource has a shorter duration than the second sidelink resource. When the first sidelink resource has a shorter duration than the second sidelink resource, the method 800 proceeds to steps S808 and S810 sequentially. When the first sidelink resource does not have a shorter duration than the second sidelink resource, the method 800 proceeds to steps S1004 and S1006 sequentially.

FIG. 13 is a flow chart of yet another exemplary method 1300 to transmit with two sidelink resources overlapped according to some embodiments of the disclosure. The method 1300 can comprise steps S802, S804 and S806. The method 1300 can also comprise step S1302, at which whether both the first and second sidelink resources are allocated by the base station 101 is determined. When not both the first and second sidelink resources are allocated by the base station 101, which means that the first sidelink resource is allocated by the first UE 102-1 and the second sidelink resource is allocated by the base station 101 or both the first and second sidelink resources are allocated by the first UE 102-1, the method 800 proceeds to steps S1004 and S1006 sequentially, that is determining the second transmission with the second sidelink resource to have a higher priority and prioritizing the second transmission with the second sidelink resource over the first transmission with the first sidelink resource. When both the first and second sidelink resources are allocated by the base station 101, the method 1300 proceeds to step S1304 to determine whether first sidelink logical channels associated with the first sidelink transmission have a higher priority than second sidelink logical channels associated with the second sidelink transmission. When it is determined that the first sidelink logical channels have a higher priority than the second sidelink logical channels, the method 1300 proceeds to steps S808 and S810 sequentially. When it is determined that the first sidelink logical channels do not have a higher priority than the second sidelink logical channels, the method 1300 proceeds to step S1306 to determine whether the first sidelink logical channels have a lower priority than the second sidelink logical channels. When it is determined that the first sidelink logical channels have a lower priority than the second sidelink logical channels, the method 1300 proceeds to steps S1004 and S1006 sequentially. When the first sidelink logical channels have the same priority as the second sidelink logical channels, the method 1300 can proceed to steps S808 and S810 sequentially or to steps S1004 and S1006 sequentially. For example, when the first sidelink logical channels associated with the first sidelink transmission have a higher priority than the second sidelink logical channels associated with the second sidelink transmission, the first UE 102-1 determines the first sidelink transmission with the first sidelink resource to have a higher priority, and prioritizes the first sidelink transmission with the first sidelink resource over the second sidelink transmission with the second sidelink resource. Alternatively, when the first sidelink logical channels associated with the first sidelink transmission have a lower priority than the second sidelink logical channels associated with the second sidelink transmission, the first UE 102-1 determines the second sidelink transmission with the second sidelink resource to have a higher priority and prioritizes the second sidelink transmission with the second sindlink resource over the first sidelink transmission with the first sidelink resource. In an embodiment, when the first sidelink logical channels associated with the first sidelink transmission have the same priority as the second sidelink logical channels associated with the second sidelink transmission, the first UE 102-1 can determine the second sidelink transmission with the second sidelink resource to have a higher priority and prioritize the second sidelink transmission with the second sindlink resource over the first sidelink transmission with the first sidelink resource, or can determine the first sidelink transmission with the first sidelink resource to have a higher priority and prioritize the first sidelink transmission with the first sindlink resource over the second sidelink transmission with the second sidelink resource.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving a grant of an uplink resource for an uplink transmission from a base station at a user equipment (UE);
    determining a sidelink resource for a sidelink transmission based on a grant from the base station or an autonomous selection by the UE, wherein the sidelink resource overlaps the uplink resource; and
    prioritizing the uplink transmission with the uplink resource over the sidelink transmission with the sidelink resource when a message of a random access channel (RACH) procedure is to be transmitted,
    wherein no message of the RACH procedure is to be transmitted, and the method further comprises:
    prioritizing the sidelink transmission with the sidelink resource over the uplink transmission with the uplink resource when the sidelink transmission has a higher priority with respect to a sidelink priority threshold and when the uplink transmission has a lower or equal priority with respect to an uplink priority threshold; and
    prioritizing the uplink transmission with the uplink resource over the sidelink transmission with the sidelink resource when the sidelink transmission has a lower or equal priority with respect to the sidelink priority threshold or when the uplink transmission has a higher priority with respect to the uplink priority threshold.

2. The method of claim 1, wherein the RACH procedure is a four-step RACH procedure, and the message is Msg3.

3. The method of claim 1, wherein the RACH procedure is a two-step RACH procedure, and the message is MsgA.

4. An apparatus, comprising:
receiving circuitry configured to receive a grant of an uplink resource for an uplink transmission from a base station;
processing circuitry configured to determine a sidelink resource for a sidelink transmission based on a grant from the base station or autonomously select the sidelink resource, wherein the sidelink resource overlaps the uplink resource; and
transmitting circuitry configured to prioritize the uplink transmission with the uplink resource over the sidelink transmission with the sidelink resource when a message of a random access channel (RACH) procedure is to be transmitted, and configured to, when no message of the RACH procedure is to be transmitted, prioritize the sidelink transmission with the sidelink resource over the uplink transmission with the uplink resource when the sidelink transmission has a higher priority with respect to a sidelink priority threshold and when the uplink transmission has a lower or equal priority with respect to an uplink priority threshold and prioritize the uplink transmission with the uplink resource over the sidelink transmission with the sidelink resource when the sidelink transmission has a lower or equal priority with respect to the sidelink priority threshold or when the uplink transmission has a higher priority with respect to the uplink priority threshold.

5. The apparatus of claim 4, wherein the RACH procedure is a four-step RACH procedure, and the message is Msg3.

6. The apparatus of claim 4, wherein the RACH procedure is a two-step RACH procedure, and the message is MsgA.

* * * * *